United States Patent [19]

Reed et al.

[11] 4,184,826
[45] Jan. 22, 1980

[54] CLOSURE AND FLASH BREAKING APPARATUS FOR METALLOGRAPHIC SPECIMEN MOLDING DEVICE

[75] Inventors: Ramsey G. Reed; Roy W. Johanson, both of St. Joseph, Mich.

[73] Assignee: Leco Corporation, St. Joseph, Mich.

[21] Appl. No.: 943,457

[22] Filed: Sep. 18, 1978

[51] Int. Cl.² ........................... B29C 17/00; B30B 1/02
[52] U.S. Cl. ...................................... 425/110; 425/412; 249/205
[58] Field of Search ............... 425/110, 127, 128, 412, 425/415, 423, 451.9, 595; 249/205

[56] References Cited
U.S. PATENT DOCUMENTS

| | | | |
|---|---|---|---|
| 2,459,205 | 1/1949 | Wells et al. | 425/412 |
| 2,889,578 | 6/1959 | Roberts et al. | 425/412 X |
| 3,063,594 | 11/1962 | Gerard et al. | 425/451.9 X |
| 3,129,463 | 4/1964 | Gill et al. | 425/110 |

*Primary Examiner*—J. Howard Flint, Jr.

*Attorney, Agent, or Firm*—Price, Heneveld, Huizenga & Cooper

[57] ABSTRACT

A closure mechanism for a metallographic sample pressure molding system includes a mold cylinder having a bayonet socket for receiving a closure member which includes an upper ram mounted thereto for lockably enclosing the mold chamber defined by the cylinder. The closure member includes a cam and means for actuating the cam for moving the upper ram an incremental distance to break flashing from the molded metallographic specimen once cured for facilitating removal of the specimen and its surrounding thermoset or thermoplastic mount. In the preferred embodiment, the mold cylinder is demountable to a mold collar at an end remote from the closure member. A piston extends into the mold chamber through the collar and an alignment coupling joins the piston to a piston rod facilitating installation of the mold cylinder to the collar. The system provides a positive locking mold chamber with easy access and facilitates removal of the molded article by breaking the flashing from the article once molded.

23 Claims, 13 Drawing Figures

4,184,826

CLOSURE AND FLASH BREAKING APPARATUS FOR METALLOGRAPHIC SPECIMEN MOLDING DEVICE

BACKGROUND OF THE INVENTION

The present invention relates to metallographic molding apparatus and particularly to improved closure means for a molding chamber associated therewith.

In the preparation of metallographic specimens for inspection, a small metallographic specimen is typically encased in a thermoplastic or thermoset material and subsequently ground and polished for examination by a microscope. In order to encapsulate the metallographic specimen, relatively small but high pressure and temperature molding tabletop sized molding devices are employed. With such systems, it is desirable to provide easy access to the mold cavity so that the operator can easily operate the system and yet have the apparatus be foolproof to assure the mold cavity is lockably sealed to prevent leakage during molding or failure of the device during the pressure molding cycle of operation. One problem with such systems has been the difficulty in removing the encapsulated metallographic specimen due to the thermoplastic or thermoset material oozing between the piston and cylinder wall during the molding cycle. This flash, as it is referred to, frequently makes it difficult to eject the specimen from the apparatus once molded.

SUMMARY OF THE INVENTION

The system of the present invention overcomes the problems of the prior art by providing a system which is easily used and provides positive locking of the mold chamber in a foolproof manner as well as integrally provides a flash breaking system to break flash from the molded specimen thereby facilitating its removal from the apparatus.

Systems embodying the present invention include a mold cylinder defining a mold chamber having a socket at one end for receiving a closure member. A piston and means driving the piston is fitted into the mold chamber at the opposite end. The closure member includes means which fit within and lock to the mold cylinder socket to positively lock the closure member to the mold cylinder. The closure member also includes a movable ram, cam means and means for actuating the cam such that the ram engages the molded article moving it incrementally within the mold chamber to break away flash thereby facilitating removal of the molded apparatus from the system.

In one embodiment of the present invention, the mold cylinder is removable from a mounting collar and the piston providing the molding pressure is coupled to a piston rod by means of an alignment coupling facilitating mounting of the mold cylinder to the collar. In other embodiments of the present invention, the closure member includes indexing and locking detent means for holding the closure member in a locked position. These and other features, advantages, and objects of the present invention can best be understood by reference to the following description thereof together with the drawings, in which:

DETAILED DESCRIPTION OF THE PREFERRED EMBODIMENT

Figure 1:
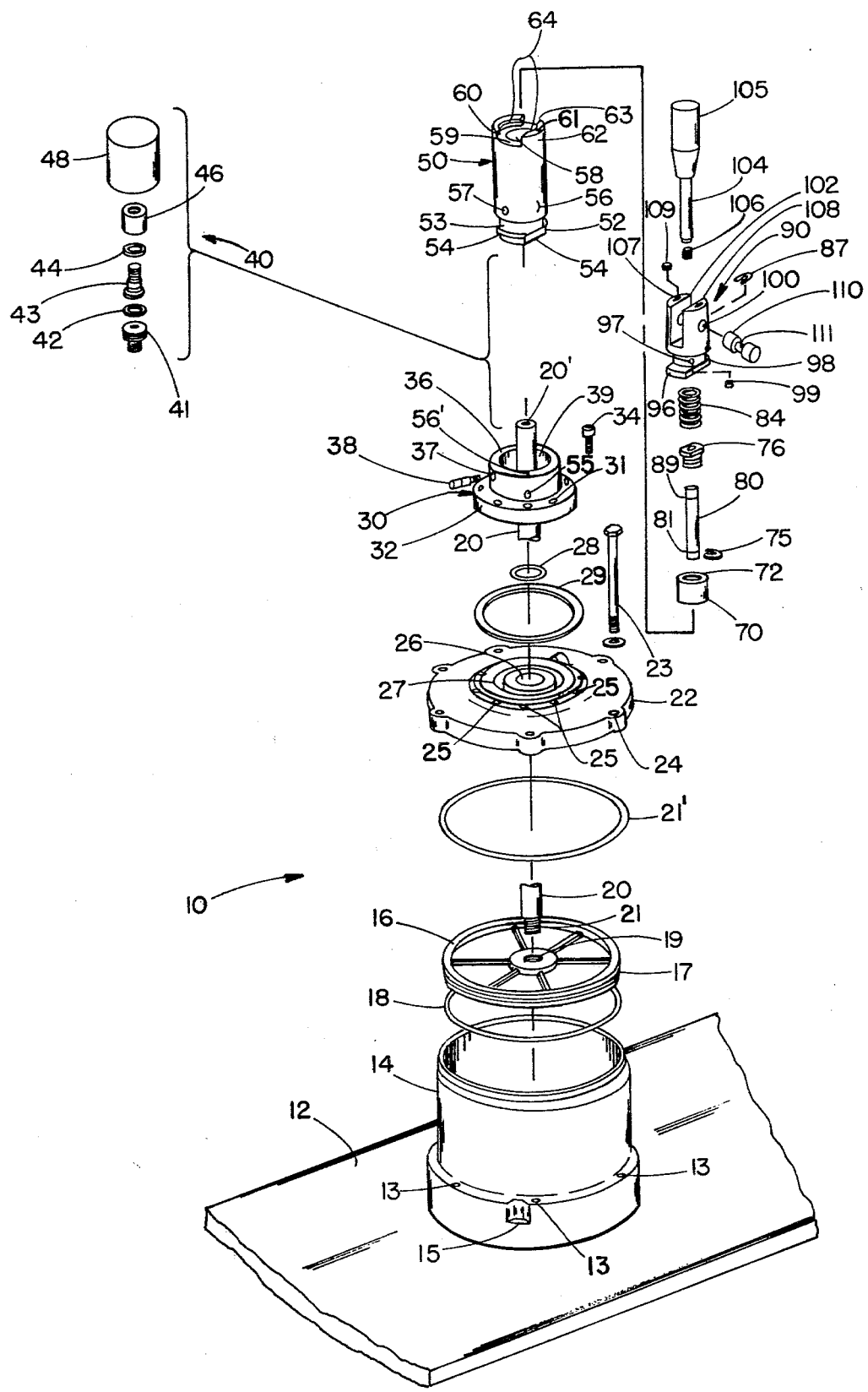
FIG. 1 is an exploded perspective view partly enlarged of the apparatus of the present invention.

Referring initially to FIG. 1, there is shown a closure mechanism 10 of the present invention which is mounted to the upper wall 12 of a suitable cabinet which includes the normal controls such as a pressure regulator, gauges, manually actuated controls for actuating a pneumatic cylinder 14 secured to wall 12. The pneumatic cylinder 14 includes an air inlet 15 for receiving pressurized air from a source (not shown) providing approximately 100 psi line pressure. A disc-shaped piston 16 fits within the cylindrical sidewall of the cylinder 14 and includes an annular recess 17 receiving an O-ring seal 18. Threadably secured within threaded aperture 19 of piston 16 is a piston rod 20 having a lower threaded end 21 which secures the rod to the center of piston 16. A cylinder head 22 is sealably secured to the cylinder 14 by means of an O-ring 21' and is mounted thereto by means of a plurality of bolts 23 spaced around the outer periphery of the head and extending downwardly through apertures 24 into threaded apertures 13 near the base of cylinder 14. The head 22 includes a central aperture 26 through which piston rod 20 extends and is sealed thereto by means of an O-ring 28. A gasket 29 fits within an annular groove 27 surrounding aperture 26 to isolate the cylinder head from the top of the cabinet.

Collar 30 has a lower flange 32 with a plurality of spaced apertures 31 around its periphery for receiving fastening screws 34 which extend through flange 32 into threaded apertures 25 surrounding recess 27 of the cylinder head. Collar 30 is thus secured to the cylinder head 22. An insulating material 29 isolates the cabinet from the piston rod 20. The cylinder is sealed by means of the O-ring 28 compressibly held between the head 26 and piston 20. An annular shoulder 36 extends upwardly from flange 32 of collar 30 and includes a cylindrical aperture 37 extending radially through the sidewall which is threaded for threadably receiving a spring loaded locking pin 38. Pin 38 is a conventional spring loaded locking pin which is threaded into aperture 37 and includes a radially movable spring biased pin for lockably but releasably holding the cylindrical mold cylinder 50 within the axial cylindrical opening 39 of collar 30.

As seen in FIG. 1, the piston rod 20 extends through the cylindrical opening 39 of collar 30 and includes a threaded aperture 20' at its upper end for receiving an alignment coupling assembly 40 shown enlarged in FIG. 1. The alignment coupling assembly 40 serves to couple a lower molding piston 48 to the upper end of piston rod 20 in a flexible manner such that the mold cylinder 50 can easily be positioned over piston 48 and secured to collar 30.

Figure 2:
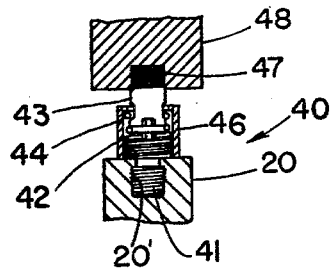
FIG. 2 is a fragmentary enlarged cross-sectional view of a portion of the structure shown in FIG. 1.

The alignment coupling is shown in detail in FIG. 2 and includes an adaptor stud 41 having a threaded lower end which is secured to threaded aperture 20' of the piston rod 20. A spherical washer 42 is positioned on the upper surface of stud 41 and a thrust stud 43 is positioned on top of washer 42 and includes a threaded end projecting upwardly therefrom. A second spherical washer 44 is positioned over the tapered head of thrust stud 43 and a threaded bushing 46 of generally cylindrical configuration and having an internal threaded body compressibly holds the thrust stud to the adaptor stud 41. Washers 42 and 44 comprise tapered rings in the preferred embodiment to provide some degree of flexing of the thrust stud 43 which, as best seen in FIG. 2, projects upwardly from the open end of bushing 46 and is threadably secured to a threaded aperture 47 in the base of the molding piston 48. Thus, the alignment coupling 40 permits the piston 48 to be tilted somewhat and shifted laterally a finite distance for alignment of the mold cylinder 50 when mounted to a collar 30 through which the piston rod and piston extend.

Mold cylinder 50 includes a flange 52 at its lower end defined by an annular slot 53 spaced above the flange. The flange 52 is milled flat at 54 at three equally spaced 120 degree intervals for fitting the flange into aperture 39 of collar 30. Shoulder 36 of collar 39 includes three inwardly projecting pins 55 which are spaced at 120 degree intervals and cylinder 50 is positioned within the collar such that flats 54 pass by the inwardly projecting pins 55. The cylinder is then rotated about 60 degrees such that an index mark 56 on the cylinder aligns with an index mark 56' on the top surface of collar 36 in which position the ears of flange 52 fit under pins 55 to hold the mold cylinder in position. The spring loaded pin 38 in this position projects into a cylindrical aperture 57 spaced above recess 53 and projecting partially through the sidewall of the mold cylinder 50 locking mold cylinder 50 to collar 30.

The mold cylinder 50 includes a cylindrical mold chamber 58 extending therethrough for receiving piston 48 at its lower end. The upper end of mold cylinder 50 includes a socket for lockably receiving the closure member. The socket is defined by a pair of arcuate shoulders 60 and 62 each circumscribing an arc of approximately 90 degrees and each including an inwardly projecting arcuate flange 64. Flanges 64 are speced above the upper annular surface 59 of the cylinder to provide clearance between the lower surface of flanges 64 and the upper surface 59 of the cylinder for captively receiving the closure member as described below. Each flange 64 includes a notch 65 (FIG. 8) defining a rotational stop for a roll pin 99' (FIG. 7) of the closure member 90.

The mold cylinder 50 is closed at its lower end by piston 48 attached to piston rod 20 and moved by the pneumatic cylinder 14 to provide the molding pressure of approximately 4200 lbs. Surrounding the mold cylinder is a resistance heater (not shown) which electrically heats the mold cavity to a temperature of approximately 285 degrees F. to mold the thermosetting or thermoplastic material employed. A variety of commercially available thermoplastic and thermosetting materials in either powder or preformed form can be used. Such materials include, for example, BAKELITE ®, epoxy, diallyl phthalate, or LUCITE ®.

Figure 3:
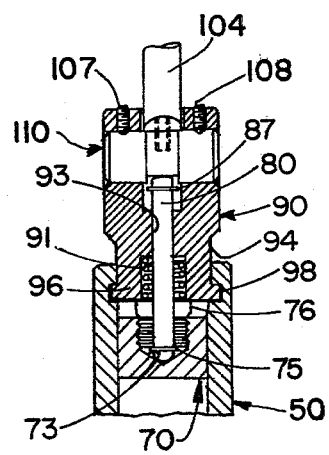
FIG. 3 is a fragmentary enlarged cross-sectional view of a portion of structure shown in FIG. 1.

The upper open end 58 of the cylinder receives an upper piston 70 having a cylindrical aperture 72 extending downwardly therein with a tapered floor 73 as best seen in FIG. 3 for centering a vertically extending push rod 80 with respect to the longitudinal axis of lower piston 70. The cylindrical wall of aperture 72 is threaded to receive a bushing 76 which captively holds the rounded end of rod 80 centered against the floor of blind aperture 72 in the piston. Bushing 76 presses against a retainer clip 75 fitted within a slot 81 near the bottom of stem 80. A compression spring 84 extends between the upper surface of bushing 76 to the floor of a cylindrical recess 91 formed upwardly within the body of closure member 90 to face the bushing against retainer 75. Spring 84, by urging piston 70 downwardly, urges body 90 upwardly when the molding process is complete such that as the closure body is opened, the spring pushes ears 96 and 98 upwardly to clear shoulders 64 preventing catching of the body when pressure is applied by cylinder 14 to remove the specimen from the mold.

Figures 6, 7:
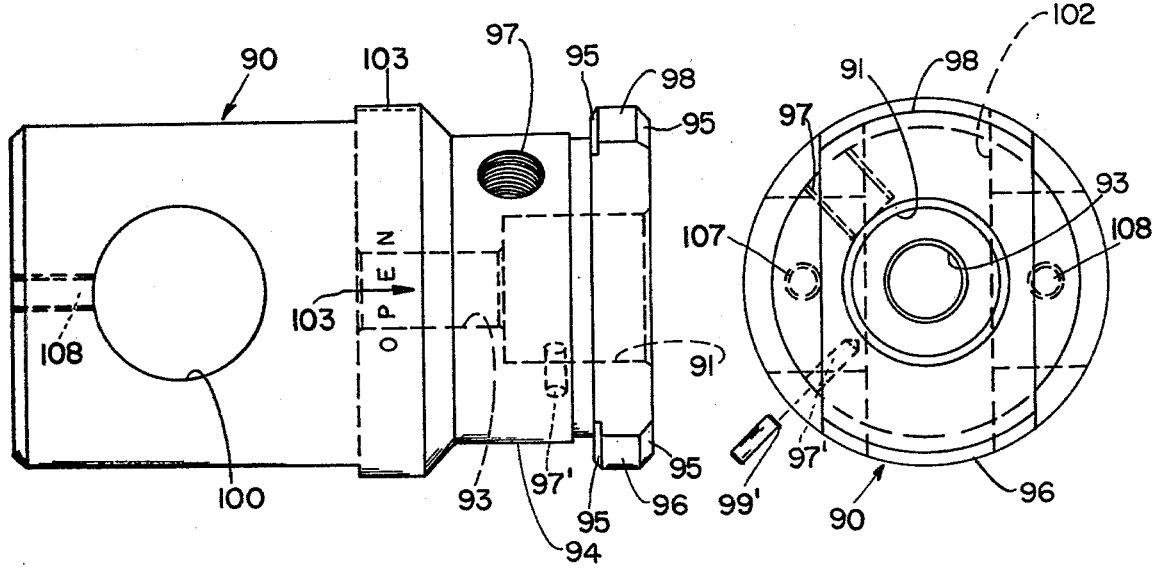
FIG. 6 is an enlarged side elevational view of the closure member shown in FIGS. 1 and 3.
FIG. 7 is a right end elevational view of the closure member shown in FIG. 6.

The closure member 90 as best seen in FIGS. 6 and 7, comprises a generally cylindrical body having a longitudinally extending aperture 93 for slidably receiving rod 80 and an annular recess 94 below which there is provided a pair of outwardly extending ears 96 and 98 which as seen in FIGS. 3 and 9 through 11, lockably secure the closure member 90 under the flanges 60 and 62 of the mold cylinder when the unit is in a closed and locked position. The closure member body includes a radially extending threaded aperture 97 for receiving a spring loaded stop pin 99 (FIG. 1) within recess 94 and spaced longitudinally along the body of the closure member such that when the ears 96 and 98 are in a position to fully engage flanges 60 and 62 of the mold cylinder 50, the stop pin extends radially outwardly against the edge 63 of the flange 62 thereby tending to prevent inadvertent rotation of the closure member once in a locked position. Spaced from pin 99 is a roll pin 99' (FIG. 7) compressibly fitted within an aperture 97' and extending axially outwardly from member 90 to seat against notches 65 (FIG. 8) of the mold cylinder when the rotational limit of the closure member with respect to cylinder 50 is reached.

Figure 4:
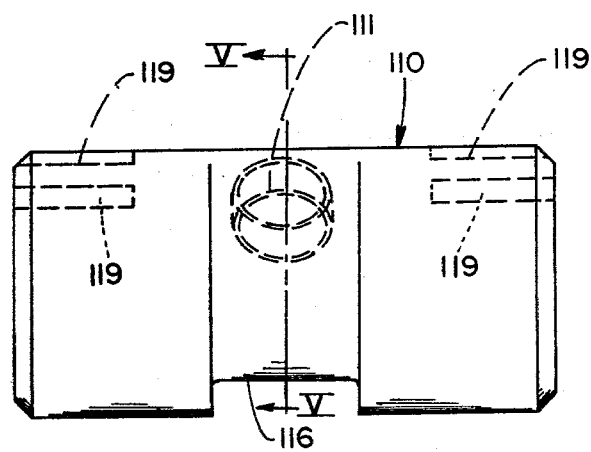
FIG. 4 is an enlarged side elevational view of cam means shown in FIGS. 1 and 3.
Figure 8:
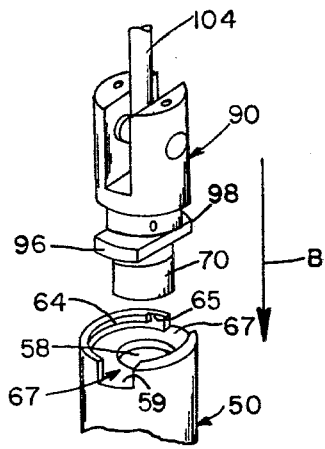
FIGS. 8 through 13 are fragmentary perspective views illustrating a sequence of operation of the apparatus of the present invention during a cycle of operation.
Figure 9:
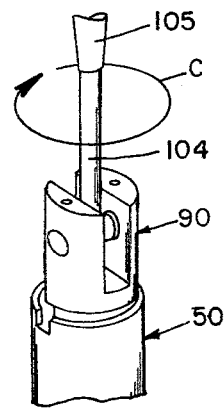

As best seen also in FIGS. 6 and 7, the closure member 90 includes a transversely extending cylindrical aperture 100 for receiving a cylindrical eccentric cam 110 shown in detail in FIGS. 8 and 9. As best seen in FIG. 6, the ears 96 and 98 include beveled edges 95 to facilitate the locking and rotation of the closure member within the socket of the mold cylinder. The upper portion of closure member 90 includes a downwardly extending transverse slot 102 (FIGS. 1 and 7) bisecting aperture 100 into two segments and permitting a rod 104 with a handle 105 at its end to extend to and be secured to a threaded aperture 111 in the central portion of cam 100 by means of a screw 106. Formed downwardly through the top semi-circular surfaces of the closure member 90 is a pair of threaded apertures 107 and 108 for receiving spring loaded pins 109 which engage detents 119, 119' (spaced 45 degrees apart) of cam 110 for holding handle 105 in an upright or 45 degree rotated position for the purpose described below. The ends of the cylindrical shaped cam are beveled as best seen in FIG. 4 and a central camming portion 116 milled to provide an eccentric cam with an approximately $\frac{1}{8}$ inch offset identified by arrow A in FIG. 5. The width of the camming area 116 is sufficient to span the diameter of rod 80 which is held proximate to the camming surface 116 when piston 70 is under the influence of the molding pressure and spring 84 is fully compressed. An upper retainer ring 87 fitted within a slot 89 near the top of rod 80 holds the rod within the body of the closure member. The mold cylinder includes a milled indicia slot 61 (FIG. 1) while the closure member includes a pair of spaced indicia 102 (FIG. 6) which align with slot 61 when the closure member is in a fully open or locked position to provide a visual check to the operator of the device.

OPERATION

As seen in FIG. 8, the closure member 90 can be completely removed from the mold cylinder 50 to provide ready access to the molding chamber through aperture 58 at the top of the mold cylinder. The specimen and molding material for encapsulating it are positioned within the mold cavity through opening 58 and as indicated by arrow B in FIG. 8, the closure member 90 is lowered into position with the ears 96 and 98 aligned with the slots 67 between flanges 64 of cylinder 50. Handle 105 is held in a vertical position by the detents 119 and once the flanges 96 and 98 engage the upper surface 59 of the mold cylinder, the handle is rotated approximately 90 degrees in a direction indicated by arrow C to lock the closure member in place as also seen in FIG. 3. In this position, the stop pin 99' (FIG. 7) engages notch 65 indicating the closure member is in its fully locked position as does the lined indicia 61 and 103 on the mold cylinder and closure member, respectively.

Figure 5:
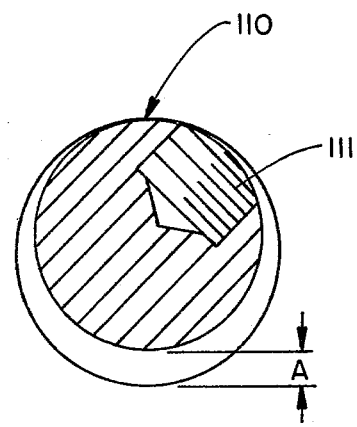
FIG. 5 is a cross-sectional view of the cam means taken along the section lines V—V of FIG. 4.
Figure 10:
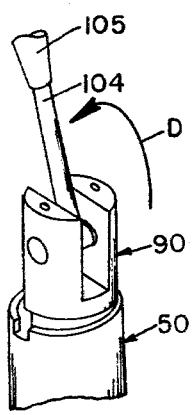

Next, as shown in FIG. 10, handle 105 is rotated rearwardly approximately 45 degrees in a direction indicated by arrow D which rotates cam 110 positioning the camming surface 116 such that push rod 80 will not engage the smallest diameter of the camming surface 116 (i.e., the bottom of the cam as shown in FIGS. 4 and 5) during a molding cycle. In this position, detents 119 (FIG. 4) again releasably hold the handle in position. Next, the heating-curing cycle of operation is accomplished by activating the conventional heater and applying pressure to cylinder 14 (FIG. 1) forcing the piston 48 upwardly in the mold cylinder compressing the thermosetting or thermoplastic material as heat is applied to the exterior of the cylinder. During the compression of the molding material within the mold cylinder, push rod 80 is forced upwardly. Once the temperature and pressure has been applied to the mold cylinder as required (typically for 6 to 9 minutes or so) the pressure is removed from cylinder 14 and the handle 105 is rotated forwardly approximately 135 degrees in a direction indicated by arrow E in FIG. 11. This rotates cam 110 such that the maximum cam diameter (at the top of the cam in FIGS. 4 and 5) engages the top of push rod 80 forcing push rod 80 downwardly as well as piston 70 coupled thereto. With piston 70 in direct contact with the now encapsulated specimen, the specimen is moved within the mold cavity approximately $\frac{1}{8}$ inch which is sufficient to break any flash which may have formed between the cylinder wall of the mold cavity and the upper and lower pistons 70 and 40, respectively. This greatly facilitates the removal of the molded article which otherwise can stick to the cylinder.

Figure 11:
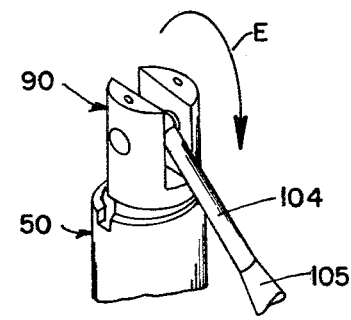
Figure 12:
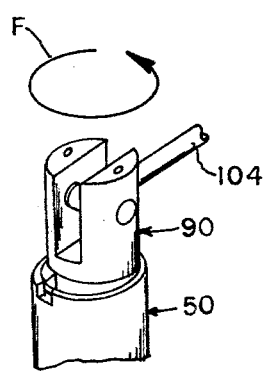
Figure 13:
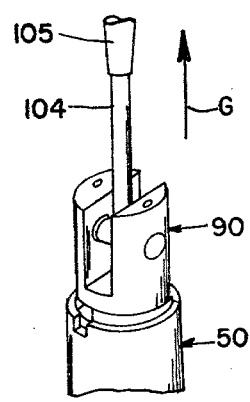

Once the flashing is broken by the step illustrated by FIG. 11 of the drawings, handle 104 is rotated in a counterclockwise direction indicated by arrow F in FIG. 12 to a fully unlocked position whereupon the handle is raised as shown in FIG. 13. The encapsulated specimen and closure member then can be readily ejected from the mold cylinder 50 as indicated by arrow G by applying pressure through cylinder 14 to the lower piston 48 which slides the specimen to the open mouth 58 of the mold cylinder where it can be removed by the operator. The cycle can then be repeated for a subsequent specimen.

It will become apparent to those skilled in the art that various modifications to the preferred embodiment of the invention disclosed and described herein can be made without departing from the spirit or scope of the invention as defined by the appended claims.

The embodiments of the invention in which an exclusive property or privilege is claimed are defined as follows.

1. A closure assembly for a metallographic specimen mounting press including a mold cylinder having a mold cavity with an open end for access, said closure assembly comprising:

a piston for enclosing the open end of the mold cavity of the mold cylinder;

a push rod having a first end coupled to said piston and an opposite end;

a closure body and means for securing said closure body to the open end of the mold cylinder including means for slidably receiving said push rod, said closure body including means for engaging said opposite end of said push rod; and means for moving said engaging means to selectively slide said push rod to move said piston within the mold cavity of the mold cylinder an incremental distance to break a molded article loose within the mold cavity.

2. The apparatus as defined in claim 1 wherein said engaging means comprises an eccentric cam rotatably mounted to said closure member.

3. The apparatus as defined in claim 2 wherein said moving means comprises means for rotating said cam to move said push rod.

4. The apparatus as defined in claim 3 wherein said means for rotating said cam comprises a handle extending from said closure body and having an end coupled to said cam.

5. The apparatus as defined in claim 4 wherein said closure body is generally cylindrical and said means for slidably receiving said push rod comprises an axially extending aperture formed through said closure body.

6. The apparatus as defined in claim 5 and further including bias means extending between said push rod and said closure body urging said push rod away from said cam means.

7. The apparatus as defined in claim 6 wherein said first end of said push rod is rounded and said piston includes a rounded blind and threaded aperture for receiving said rounded end of said push rod to center the push rod with respect to said piston, and bushing means for securing said push rod to said piston.

8. The apparatus as defined in claim 7 wherein said cam includes detent means and wherein said closure body includes biased pin means engaging said detent means for releasably holding said handle in at least one predetermined position.

9. For use in a metallographic specimen mounting press, an improved mold cylinder and closure therefor comprising:

a base;

cylinder means supported by said base and having a piston rod including a piston coupled to said piston rod;

a mold body defining a mold cavity having an opening into which said piston movably extends and an access opening; and a closure member removably fitted to said mold body to enclose said access opening, said closure member including movable means extending into said mold cavity for moving the molded specimen an incremental distance to break the molded specimen loose in the mold cavity.

10. The apparatus as defined in claim 9 and further including means for removably mounting said mold body to said cylinder.

11. The apparatus as defined in claim 10 wherein said apparatus further includes an alignment coupling for coupling said piston to said piston rod.

12. The apparatus as defined in claim 11 wherein said means for removably mounting said mold body to said cylinder means comprises a collar having a mold body receiving aperture and means for locking said mold body to said collar.

13. The apparatus as defined in claim 9 wherein said movable means extending into said mold cavity comprises a second piston movably mounted to said closure member and means for moving said second piston an incremental distance.

14. The apparatus as defined in claim 13 wherein said means for moving said second piston comprises a push rod having one end coupled to said piston and an opposite end, and cam means mounted to said closure member to selectively engage said opposite end of said push rod, and means for moving said cam means to move said push rod.

15. For use in a metallographic specimen mounting press, an improved mold cylinder and closure therefor comprising:

a cylindrical mold body defining a mold cavity having an access opening for receiving a metallographic specimen to be encapsulated, said mold body including socket means surrounding said access opening for lockably receiving closure means; and a closure member removably fitted to said socket of said mold body to enclose said access opening, said closure member including stop means cooperating with said mold body for positioning said closure member in a fully locked or fully unlocked position in said socket means of said mold body.

16. The apparatus as defined in claim 15 wherein said socket means is defined by a pair of radially spaced flanges extending in axially spaced relationship from said mold body and wherein said closure member includes a pair of spaced ears which extend under said flanges to secure said closure member to said mold body.

17. The apparatus as defined in claim 16 wherein said stop means includes a fixed pin extending radially outwardly from said closure member and axially aligned with said flanges of said mold body to alternately contact an edge of different ones of said flanges to alternately stop said closure member in a locked and unlocked position as said closure member is rotated with respect to said mold body.

18. The apparatus as defined in claim 17 wherein said stop means further includes a radially movable spring loaded pin for alternately releasably contacting opposite edges of one of said flanges when said closure member is in a locked and unlocked position.

19. The apparatus as defined in claim 18 wherein said closure member further includes movable means extending into said mold cavity for moving the molded specimen an incremental distance to break the molded specimen loose in the mold cavity.

20. The apparatus as defined in claim 19 wherein said movable means extending into said mold cavity comprises a piston movably mounted to said closure member and means for moving said second piston an incremental distance.

21. The apparatus as defined in claim 20 wherein said means for moving said second piston comprises a push rod having one end coupled to said piston and an opposite end, and cam means mounted to said closure member to selectively engage said opposite end of said push rod, and means for moving said cam means to move said push rod.

22. The apparatus as defined in claim 21 wherein said means for moving said cam means comprises a handle extending from said closure body and having an end coupled to said cam means.

23. The apparatus as defined in claim 22 wherein said cam means includes detent means and wherein said closure member includes biased pin means engaging said detent means for releasably holding said handle in at least one predetermined position.

* * * * *